US006963177B2

(12) United States Patent
Ito et al.

(10) Patent No.: US 6,963,177 B2
(45) Date of Patent: Nov. 8, 2005

(54) OPEN CIRCUIT DETECTION FOR VEHICULAR LAMP

(75) Inventors: Masayasu Ito, Shizuoka-ken (JP); Kouichi Isobe, Shizuoka-ken (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/825,408

(22) Filed: Apr. 15, 2004

(65) Prior Publication Data

US 2004/0207328 A1    Oct. 21, 2004

(30) Foreign Application Priority Data

Apr. 16, 2003    (JP) ............................. 2003-111954

(51) Int. Cl.[7] ................................. G05F 1/00
(52) U.S. Cl. ..................... 315/291; 315/307; 315/312
(58) Field of Search ............................... 315/291, 307, 315/297, 224, 312, 311, 320, 323, 324, 325

(56) References Cited

U.S. PATENT DOCUMENTS 6,351,079 B1 * 2/2002 Willis ..................... 315/200 A 6,498,440 B2 * 12/2002 Stam et al. ................. 315/291
6,710,555 B1 * 3/2004 Terada et al. ............... 315/291
2002/0011804 A1 * 1/2002 Fujimura et al. ........... 315/291

FOREIGN PATENT DOCUMENTS

JP          10-217851         8/1998

OTHER PUBLICATIONS

Patent Abstracts of Japan, Publication No. 10-217851 dated Aug. 18, 1998, 1 pg.

* cited by examiner

*Primary Examiner*—Tuyet Thi Vo
(74) *Attorney, Agent, or Firm*—Osha-Liang LLP

(57) ABSTRACT

A vehicular lamp used for a vehicle includes a semiconductor light emitting element for emitting light, a resistor for current detection for causing a current detection voltage in response to a current flowing through the semiconductor light emitting element, the resistor being coupled in series to the semiconductor light emitting element, a serial diode being coupled in series to the resistor for current detection and the semiconductor light emitting element in a forward direction, and an open circuit detecting unit for detecting an open circuit of the semiconductor light emitting element based on a sum voltage, which is a sum of a forward voltage of the serial diode and the current detection voltage.

5 Claims, 3 Drawing Sheets

OPEN CIRCUIT DETECTION FOR VEHICULAR LAMP

BACKGROUND OF THE INVENTION

1. Field of the Invention

The present invention relates to a vehicular lamp. More particularly, the present invention relates to a vehicular lamp used for a vehicle.

2. Description of the Related Art

A vehicular lamp using a filament bulb as a light source has been known so far. In this lamp the open circuit of the light source is detected by measuring the impedance of the lamp. In addition, a vehicular lamp open circuit detecting apparatus used for a brake lamp with multiple lamp units has been known as disclosed, for example, in Japanese Patent Application Laid-Open No. 1998-217851.

If a light emitting diode is used as the light source, however, the light emitting diode causes a forward voltage higher than that of the lamp filament. Accordingly, the impedance of the lamp reaches a high level even though the light emitting diode as a light source is not open-circuited. Therefore, it might be difficult to properly detect the open circuit of the light source.

SUMMARY OF THE INVENTION

Therefore, it is an object of the present invention to provide a vehicular lamp, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, a vehicular lamp used for a vehicle includes a semiconductor light emitting element for emitting light, a resistor for current detection for causing a current detection voltage in response to a current flowing through the semiconductor light emitting element, the resistor being coupled in series to the semiconductor light emitting element, a serial diode being coupled in series to the resistor for current detection and the semiconductor light emitting element in a forward direction, and an open circuit detecting unit for detecting an open circuit of the semiconductor light emitting element based on a sum voltage, which is a sum of a forward voltage of the serial diode and the current detection voltage.

The open circuit detecting unit may include a transistor for detecting the open circuit by receiving a voltage based on the sum voltage as a base-emitter voltage thereof and being turned on or off in response to the base-emitter voltage, and a low threshold voltage diode having a forward threshold voltage lower than that of the serial diode, the low threshold voltage diode being coupled to an emitter terminal of the transistor in a forward direction.

The open circuit detecting unit may further include a coupling resistor being coupled in series to the semiconductor light emitting element and the low threshold voltage diode therebetween, and in parallel to the resistor for current detection, an electric resistance of the coupling resistor being larger than that of the resistor for current detection.

The vehicular lamp may further include a plurality of the semiconductor light emitting elements being coupled in parallel, a plurality of the resistors for current detection being provided respectively in response to each of the semiconductor light emitting elements, the resistors for current detection being coupled in series respectively to the corresponding semiconductor light emitting element, and a plurality of the serial diodes being provided respectively in response to each of the semiconductor light emitting elements, the serial diodes being coupled in series respectively to the corresponding semiconductor light emitting element and resistor for current detection in a forward direction, wherein the open circuit detecting unit may further include a plurality of the transistors respectively receiving a voltage based on the sum voltage caused by the corresponding resistor for current detection and serial diode as a base-emitter voltage thereof, the transistors being provided respectively in response to each of the semiconductor light emitting elements, and the low threshold voltage diode may be coupled in common to each emitter terminal of the transistors in the forward direction.

The vehicular lamp may further include a plurality of the semiconductor light emitting elements being coupled in parallel, and a plurality of the resistors for current detection being provided respectively in response to each of the semiconductor light emitting elements for causing the current detection voltage in response to a current flowing through the corresponding semiconductor light emitting element, the resistors for current detection being coupled in series respectively to the corresponding semiconductor light emitting element, wherein the serial diode may be coupled in series to each of the semiconductor light emitting elements with the resistors for current detection interposed therebetween, and the open circuit detecting unit may be provided in common to the semiconductor light emitting elements, and detects the open circuit of the semiconductor light emitting element based on the sum voltage, which is a sum of the smallest one of the current detection voltages caused by the resistors for current detection and the forward voltage of the serial diode.

The vehicular lamp to which the present invention may be applied includes but not limited to headlamp, tail lamp and turn-signal lamp of automobiles, motorcycles and trains, and the headlamp includes, but not limited to, regular headlamp, fog lamp and cornering lamp.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
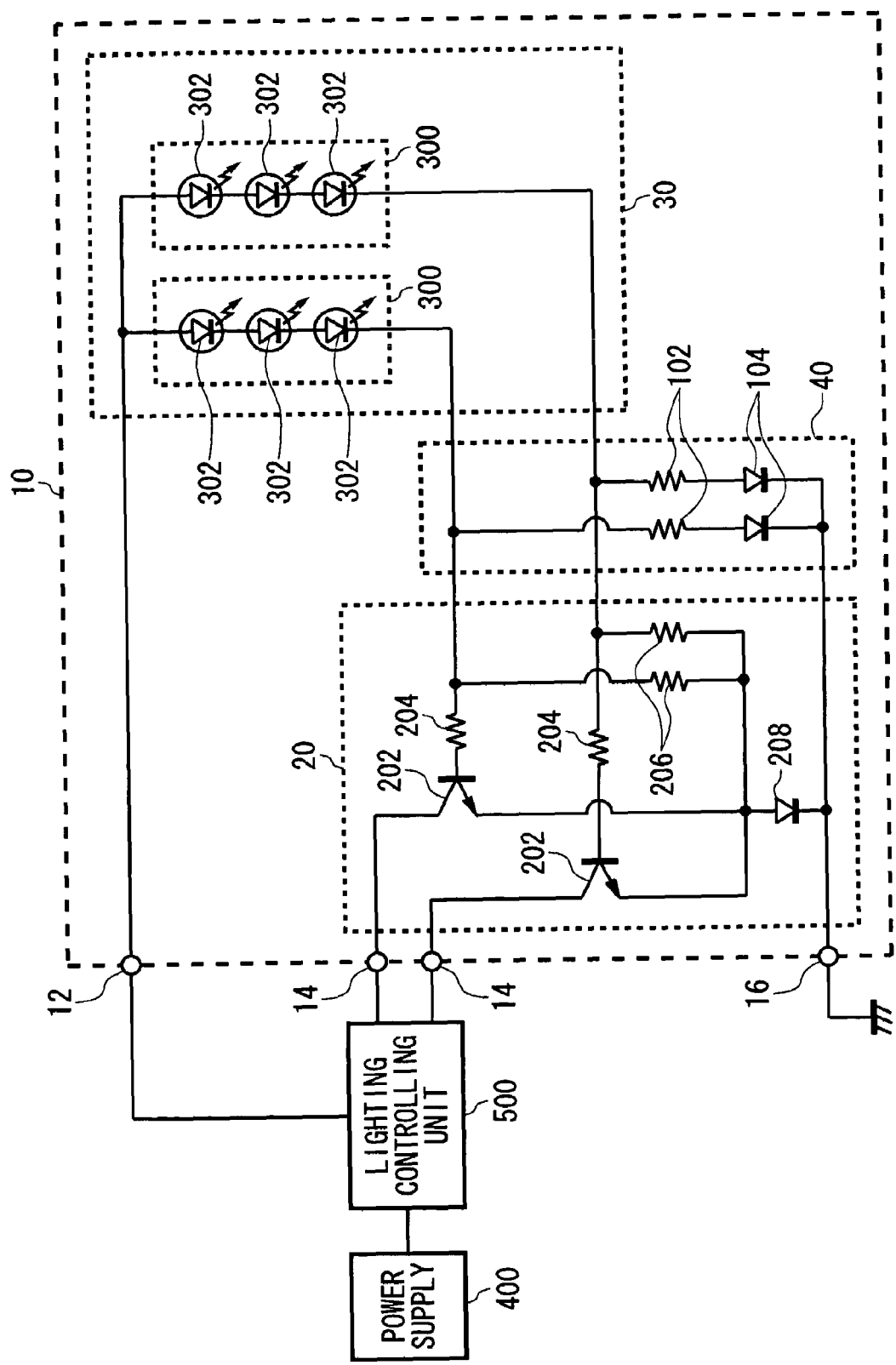
FIG. 1 shows an example of the configuration of a vehicular lamp 10 related to an exemplary embodiment of the present invention.

FIG. 1 shows an example of the configuration of a vehicular lamp 10 with a power supply 400 and a lighting controlling unit 500 related to an exemplary embodiment of the present invention. The vehicular lamp 10 of this embodiment is provided to the body of a vehicle such as a car, and used as a turn lamp. The vehicular lamp 10 may be used as a stop lamp, tail lamp, head lamp, etc. The vehicular lamp 10 of this embodiment informs the outside of the vehicular lamp 10 whether the light source block 30 included in the vehicular lamp 10 is open-circuited or not.

The power supply 400 which is a battery of the vehicle supplies power based on direct current power to the lighting controlling unit 500. The lighting controlling unit 500 supplies the power which is intermittent at a predetermined period to the vehicular lamp 10 via the terminal 12 so as to turn on or off the light source block 30. And the lighting controlling unit 500 receives the information indicating that the light source block 30 is open-circuited from the vehicular lamp 10 via a plurality of terminals 14, and controls the power supplied to the vehicular lamp 10 based on the received information.

Further, if the light source block 30 is open-circuited, the lighting controlling unit 500 informs a driver of the vehicle that the light source block 30 is open circuited by reducing the intermittence period of the power supplied to the vehicular lamp 10. In another embodiment, the lighting controlling unit 500 may drive an indicator LED (Light Emitting Diode) provided on a control panel of the vehicle for indicating the on-off condition of the light source block 30. In this case, the driver of the vehicle can further easily recognize the open circuit of the light source block 30.

The vehicular lamp 10 receives a positive voltage from the lighting controlling unit 500 via the terminal 12, and is electrically coupled to the ground via the terminal 16. The vehicular lamp 10 includes an open circuit detecting unit 20, a light source block 30, and a current detecting unit 40. The light source block 30 is coupled in series to both the open circuit detecting unit 20 and the current detecting unit 40.

The light source block 30 includes a plurality of light source arrays 300 being coupled in parallel to each other with their upstream ends in the current direction being coupled to the terminal 12. In addition, each of the light source arrays 300 includes a plurality of light sources 302 being coupled in series to each other in a forward direction.

The light sources 302 emit light by the received power. The light sources 302 of this embodiment which are light emitting diodes are an example of the semiconductor light emitting elements.

Although the vehicular lamp 10 includes a plurality of light sources 302 in this embodiment, the vehicular lamp 10 may include one light source 302 in another embodiment.

The current detecting unit 40 includes a plurality of resistors for current detection 102 and a plurality of the diodes 104 in response to a plurality of light source arrays 300. Each of the diodes 104 is coupled in series to the corresponding light source array 300 via the corresponding resistor for current detection 102 in the forward direction. Each cathode of the diodes 104 is grounded via the terminal 16. Since each of the diodes 104 is coupled in series to the corresponding light source array 300 in the forward direction, each of the light source arrays 300 is protected when a reverse polarity voltage or reverse polarity surge voltage is applied to the vehicular lamp 10. Accordingly, the diodes 104 protect the light sources 302 from the reverse polarity voltage. Further, each of the diodes 104 of this embodiment is an example of a serial diode.

Each of the resistors for current detection 102 is coupled in series respectively to the downstream end of the corresponding light source array 300 in response to the current direction. Accordingly, each of the resistors for current detection 102 causes a current detection voltage in response to the current flowing through the corresponding light source array 300 across both ends thereof. Therefore, between the end of each of the resistors for current detection 102 not being connected to each of the diodes 104 and the corresponding cathode of each of the diodes 104 in response to each resistor for current detection 102 there occurs a sum voltage which is the sum of the forward voltage of the diode 104 and the current detection voltage of the resistor for current detection 102.

The open circuit detecting unit 20 includes a diode 208, a plurality of NPN transistors 202, a plurality of base resistors 204, and a plurality of pull-down resistors 206 provided in response to a plurality of light source arrays 300. Each of the pull-down resistors 206 is coupled in series to the diode 208 and the corresponding light source array 300 between the diode 208 and the corresponding light source array 300, and in parallel to the corresponding resistor for current detection 102. In addition, the electric resistance of the pull-down resistors 206 is larger than that of the resistors for current detection 102. Accordingly, the current flowing through each of the pull-down resistors 206 is smaller than that of each of the diodes 104. Each of the pull-down resistors 206 is an example of the coupling resistors.

The base terminal of each of the NPN transistors 202 is coupled to the downstream end of the corresponding light source array 300 in the current direction via the corresponding base resistor 204. Accordingly, each of the NPN transistors 202 receives a voltage based on the sum voltage caused by the corresponding resistor for current detection 102 and the corresponding diode 104 as a base-emitter voltage thereof via the corresponding base resistor 204. The NPN transistors 202 are turned on or off by the received base-emitter voltage.

The collector terminal of each of the NPN transistors 202 is coupled to the lighting controlling unit 500 via each of the terminals 14. The emitter terminal of each of the NPN transistors 202 is grounded via the diode 208 being coupled to the corresponding emitter terminal in the forward direction.

Here, when no light source 302 is open-circuited, the current flowing through each of the light source arrays 300 flows through the corresponding resistor for current detection 102 and diode 104, and the voltage based on the sum voltage occurring across the corresponding resistor for current detection 102 and diode 104 is applied to the base terminal of each of the NPN transistors 202. In this case, each of the NPN transistors 202 is turned on, and the collector current flowing inwards from each of the terminals 14 flows towards the ground via the diode 208.

Meanwhile, when any of light sources 302 is open-circuited, no current flows through the resistor for current detection 102 and diodes 104 in response to the light source array 300 including the open-circuited light source 302. Accordingly, the sum voltage occurring across the corresponding resistor for current detection 102 and diode 104 is smaller than that in case the corresponding light source array 300 is not open-circuited. In this case, the voltage between the base terminal of the NPN transistor 202 and the ground decreases up to the forward voltage of the diode 208 via the pull-down resistors 206. Accordingly, the corresponding NPN transistor 202 is turned off, and the collector current flowing from the corresponding terminal 14 to the ground is blocked.

As above, the open circuit detecting unit 20 detects the open circuit of the light sources 302 based on the sum voltage when at least one of the light sources 302 is open-circuited, and informs the lighting controlling unit 500 that one of the light sources 302 is open-circuited via the terminals 14. The vehicular lamp 10 can properly detect the open circuit of the light sources 302 and sends the detection result to the lighting controlling unit 500.

The diode 208 is coupled in common to the emitter terminal of each of the NPN transistors 202 in the forward direction. The cathode of the diode 208 is grounded via the terminal 16. Accordingly, the diode 208 protects each of the NPN transistors 202 from the reverse polarity voltage.

The anode of the diode 208 is coupled to the downstream end of the light source array 300 in the current direction in response to each of the pull-down resistors 206 via each of the pull-down resistors 206. Accordingly, the diode 208 protects each of the light source arrays 300 from the reverse polarity voltage. The diode 208 has its forward voltage less than that of each of the diodes 104. Accordingly, the corresponding NPN transistor 202 can be properly turned on or off in response to the open circuit of each of the light source arrays 300. The diode 208 of this embodiment is a schottky barrier diode, and an example of a low threshold voltage diode. The low threshold voltage diode has its threshold voltage in the forward direction lower than that of a PN junction diode using silicon.

Further in this embodiment, since the electric resistance of the pull-down resistors 206 is larger than that of the resistors for current detection 102, the current flowing through each of the pull-down resistors 206 is smaller than that of the corresponding resistor for current detection 102. In addition, when no light source array 300 is open-circuited, the diode 208 conducts the emitter current of a plurality of NPN transistors 202 and the current flowing through a plurality of pull-down resistors 206. The electric resistance of each of the pull-down resistors 206 is preferably equivalent to approximately not conducting the current through the pull-down resistors 206. In this case, the current flowing through the diode 208 is smaller than that flowing through each of a plurality of the diodes 104, it is possible to use a low power consumption diode as the diode 208 compared to the diodes 104. Accordingly, the vehicular lamp 10 can be provided with low cost.

The power supply 400 is a battery mounted on the vehicle whose rated output voltage is 13.5V. In this case, the output voltage of the power supply 400 might decrease to about 9V as time lapses. In this case, in response to the decrease of the output voltage, the current flowing through the light source block 30 decreases and the current detection voltage caused by the resistors for current detection 102 decreases. Accordingly, in place of the sum voltage, if the open circuit of the light source block 30 is detected based on the current detection voltage, the open circuit of the light source block 30 might not be properly detected.

For example, in order to turn on or off the NPN transistors 202 in response to the open circuit of the light source block 30, it is necessary for the vehicular lamp 10 to receive at least the following voltage from the power supply 400:

0.8V+(2.2V×3)+0.7V=8.1V where the forward voltage of the diodes 104 which is for reverse connection protection, the forward voltage of the light sources 302, the base-emitter voltage of the NPN transistors 202 are 0.8V, 2.2V, and 0.7V respectively. In this case, In consideration of the performance at a low temperature and/or the deviation of the characteristics of the light source block 30, when the output voltage of the power supply 400 decreases, the open circuit of the light source block 30 might not be properly detected.

In this embodiment, however, let the forward voltage of the diode 208 be about 0.1V, in order to turn on or off the NPN transistors 202 in response to the open circuit of the light source block 30, it is preferable for the vehicular lamp 10 to receive the following voltage from the power supply 400:

(2.2V×3)+0.7V+0.1V=7.4V.

Therefore, according to this embodiment, although the output voltage of the power supply 400 decreases, the vehicular lamp 10 can properly detect the open circuit of the light source block 30.

In addition, if the number of the light sources 302 in series to the light source arrays 300 is 2 or less, the open circuit of the light source block 30 might not be properly detected based on the current detection voltage, even though the output voltage of the power supply 400 decreases to about 9V. In this case, however, in order to obtain the amount of light required for the vehicular lamp 10, it is necessary to increase the number of the light source arrays 300 being coupled in parallel, and the current consumption of the vehicular lamp 10 increases. In this case, the cost of the vehicular lamp 10 might increase due to heat radiation, size of parts, etc. In this embodiment, however, the vehicular lamp 10 can properly detect the open circuit of the light source block 30 without increasing the number of the light source arrays 300 in parallel. Accordingly, the vehicular lamp 10 can be provided at low cost.

Figure 2:
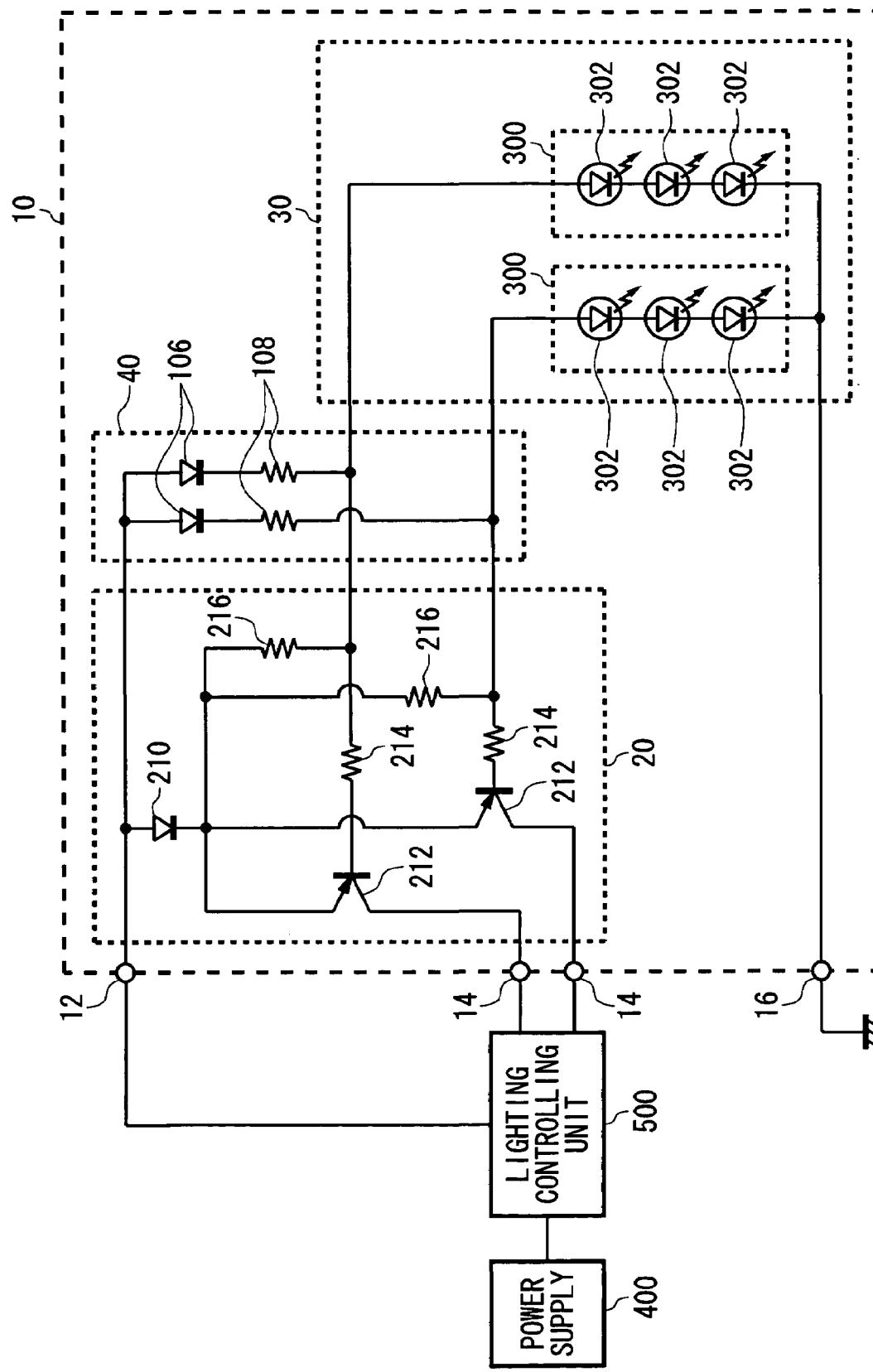
FIG. 2 shows another example of the configuration of a vehicular lamp 10.

FIG. 2 shows another example of the configuration of a vehicular lamp 10 with a power supply 400 and a lighting controlling unit 500 related to an exemplary embodiment of the present invention. Matters in this embodiment given the same symbols as those in FIG. 1 except the matters to be described below will not be described because they have the same or similar configuration as those in FIG. 1.

The current detecting unit 40 includes a plurality of the diodes 106 and a plurality of resistors for current detection 108 in response to a plurality of light source arrays 300. The cathode of each of diodes 106 receives a positive voltage from the lighting controlling unit 500 via the terminal 12. The cathode of each of diodes 106 is coupled to the corresponding light source array 300 via the corresponding resistor for current detection 108. Accordingly, the diodes 106 protect the corresponding light source arrays 300 from the reverse polarity voltage. Further, the diodes 106 are an example of serial diodes. The downstream ends of the light source arrays 300 in the current direction are grounded via the terminal 16.

Each of the resistors for current detection 108 is coupled in series to the upstream end of the corresponding light source array 300 in the current direction. Accordingly, each of the resistors for current detection 108 causes the current detection voltage in response to the current flowing through the corresponding light source array 300 across both ends thereof. Therefore, between the end of each of the resistors for current detection 108 not being connected to each of the diodes 106 and the corresponding anode of each diode 106 in response to each resistor for current detection 108 there occurs a sum voltage which is the sum of the forward voltage of the diode 106 and the current detection voltage of the resistor for current detection 108.

The open circuit detecting unit 20 includes a diode 210, a plurality of PNP transistors 212, base resistors 214, and pull-up resistors 216 in response to a plurality of light source arrays 300. Each of the pull-up resistors 216 is coupled in series to the diode 210 and the corresponding light source array 300 between the diode 210 and the corresponding light source array 300, and in parallel to the corresponding resistor for current detection 108. In addition, the electric resistance of the pull-up resistors 216 is larger than that of the resistors for current detection 108. Accordingly, the current flowing through each of the pull-up resistors 216 is smaller than that of each of the diodes 106. Each of the pull-up resistors 216 is an example of coupling resistors.

The anode of the diode 210 receives the positive voltage from the lighting controlling unit 500 via the terminal 12. The cathode of the diode 210 is coupled to the upstream end of the corresponding light source array 300 in the current direction via each of the pull-up resistors 216. Accordingly, the diode 210 protects each of the light source arrays 300 from the reverse polarity voltage.

The cathode of the diode 210 is coupled to the emitter terminal of each of the PNP transistors 212. Accordingly, the diode 210 protects each of the PNP transistors 212 from the reverse polarity voltage. The diode 210 of this embodiment is a schottky barrier diode, and an example of a low threshold voltage diode.

The base terminal of each of the PNP transistors 212 is coupled to the downstream end of the corresponding light source array 300 in the current direction via the corresponding base resistors 214. Accordingly, each of the PNP transistors 212 receives the voltage based on the sum voltage caused by the corresponding resistor for current detection 108 and the corresponding diode 106 as a base-emitter voltage via the corresponding base resistor 214. The collector terminal of each of the PNP transistors 212 is coupled to the lighting controlling unit 500 via each of the terminals 14.

Here, when no light source 302 is open-circuited, the current flowing through each of the light source arrays 300 flows through the corresponding resistor for current detection 108 and diode 106. And each of the PNP transistors 212 is turned on based on the sum voltage occurring across the corresponding resistor for current detection 108 and diode 106, and the current flowing inwards from each of the diode 210 flows towards the lighting controlling unit 500 via the terminal 14.

Meanwhile, when any of light sources 302 is open-circuited, no current flows through the resistor for current detection 108 and diodes 106 in response to the light source array 300 including the open-circuited light source 302. Accordingly, the sum voltage occurring across the corresponding resistor for current detection 108 and diode 106 is smaller than that in case the corresponding light source array 300 is not open-circuited. The voltage at the base terminal of the PNP transistors 212 increases up to a voltage equivalent to the positive voltage applied via the terminal 12 from which the forward voltage of the diode 210 is subtracted via the pull-up resistors 216. Accordingly, the corresponding PNP transistor 212 is turned off, and the collector current flowing from the diode 210 to the lighting controlling unit 500 via the terminal 14 is blocked.

As above, in this embodiment, the open circuit detecting unit 20 detects the open circuit of the light sources 302 based on the sum voltage when at least one of the light sources 302 is open-circuited, and informs the lighting controlling unit 500 that one of the light sources 302 is open-circuited via the terminals 14. Accordingly, the vehicular lamp 10 can properly detect the open-circuit of the light sources 302 and sends the detection result to the lighting controlling unit 500.

Figure 3:
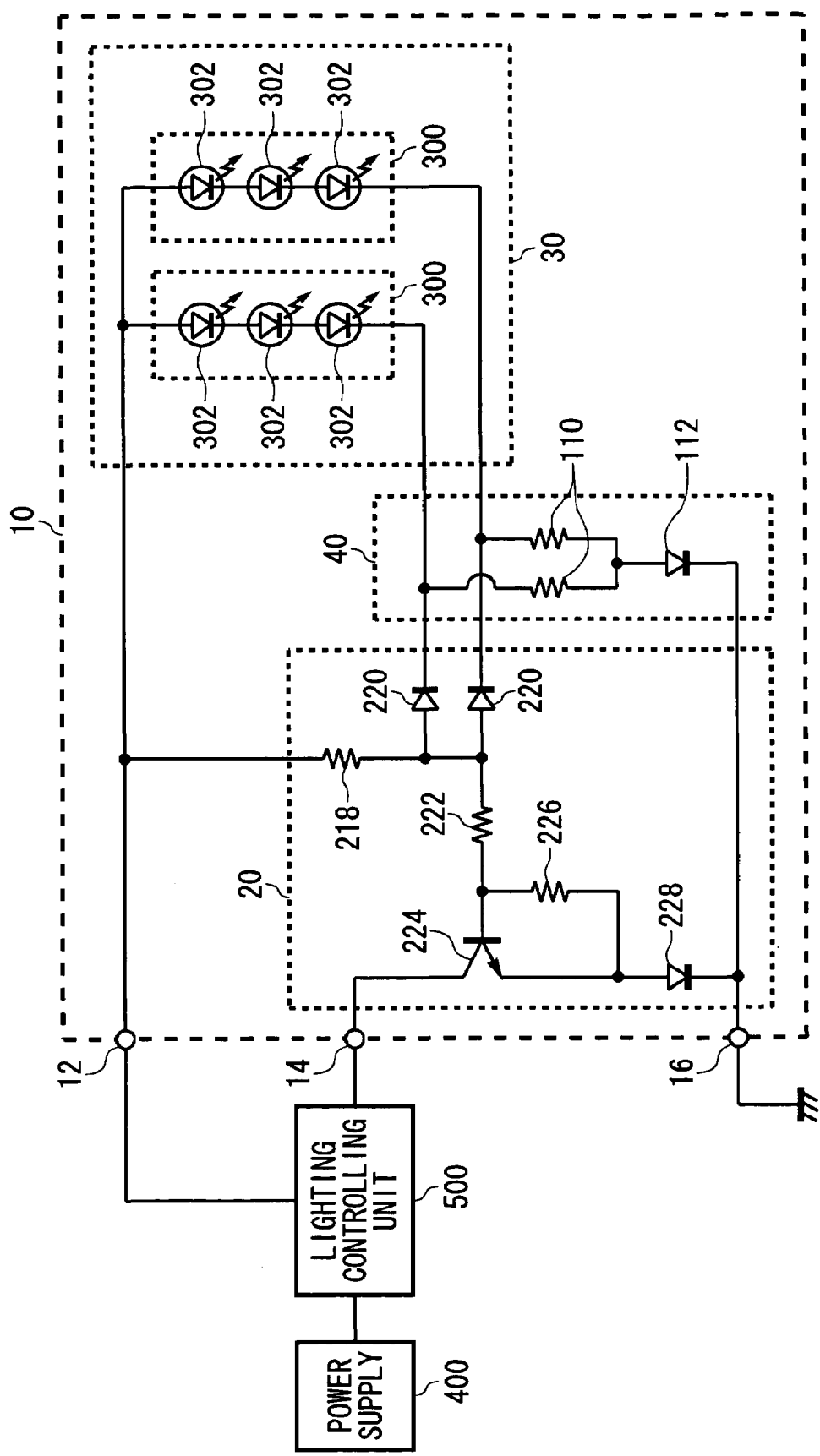
FIG. 3 shows further another example of the configuration of a vehicular lamp 10.

FIG. 3 shows further another example of the configuration of a vehicular lamp 10 with a power supply 400 and a lighting controlling unit 500 related to an exemplary embodiment of the present invention. Matters in this embodiment given the same symbols as those in FIG. 1 except the matters to be described below will not be described because they have the same or similar configuration as those in FIG. 1.

The current detecting unit 40 includes a diode 112 and a plurality of resistors for current detection 110 in response to a plurality of light source arrays 300. The diode 112 is provided in common to the light source arrays 300. The anode of the diode 112 is coupled to each of the light source arrays 300 via each of the resistors for current detection 110. The cathode of the diode 112 is grounded via the terminal 16. Accordingly, the diode 112 protects the corresponding light source arrays 300 from the reverse polarity voltage. In this embodiment, the diode 112 is an example of a serial diode.

Each of the resistors for current detection 110 is coupled in series to the downstream end of the corresponding light source array 300 in the current direction. Accordingly, each of the resistors for current detection 110 causes the current detection voltage in response to the current flowing through the corresponding light source array 300 across both ends thereof. Therefore, between the end of each of the resistors for current detection 110 not being connected to the diode 112 and the cathode of the diode 112 in response to each resistor for current detection 110 there occurs a sum voltage which is the sum of the forward voltage of the diode 112 and the current detection voltage of the resistor for current detection 110.

The open circuit detecting unit 20 includes a pull-up resistors 218, a base resistor 222, an NPN transistor 224, a base-emitter resistor 226, a diode 228, and a plurality of diodes 220 in response to a plurality of the light source arrays 300.

The NPN transistor 224 is provided in common to a plurality of the light source arrays 300. The collector terminal of the NPN transistor 224 is coupled to the lighting controlling unit 500 via the terminal 14. The emitter terminal of the NPN transistor 224 is coupled to the ground via the diode 228 and the terminal 16. The diode 228 is provided between the emitter terminal of the NPN transistor 224 and the ground, and is coupled in series to the emitter terminal of the NPN transistor 224 in the forward direction. Accordingly, the diode 228 protects the NPN transistor 224 from the reverse polarity voltage. Further, the diode 228 is a schottky barrier diode, and an example of a low threshold voltage diode.

The base-emitter resistor 226 is coupled between the base and emitter terminals of the NPN transistor 224. The base-emitter resistor 226 is coupled in series to the corresponding light source array 300 and diode 228 between the corresponding light source array 300 and diode 228, and in parallel to the corresponding resistor for current detection 110. The electric resistance of the base-emitter resistor 226 is larger than that of the resistors for current detection 110. Accordingly, the current flowing through the base-emitter resistor 226 is smaller than that of each of the resistors for current detection 110. The base-emitter resistor 226 is an example of the coupling resistor.

The base terminal of the NPN transistor 224 is pulled up by the pull-up resistors 218 coupled in series via the base resistors 222. An end of the base resistor 222 is coupled to the base terminal of the NPN transistor 224, and the other end of the base resistor 222 is coupled to the anode of each of the diodes 220. The cathode of each of the diodes 220 is coupled to the downstream end of the corresponding light source array 300 in the current direction.

Here, when no light source arrays 300 is open-circuited, due to the current flowing through each of the resistors for current detection 110, the voltage between the cathode of each of the diodes 220 and the ground increases, and no forward current flows through each of the diodes 220. In this case, since the electric resistance of the pull-up resistors 218, the base resistors 222, and the base-emitter resistor 226 is set in order that the NPN transistor 224 is turned on, the current flows inwards from the lighting controlling unit 500 via the terminal 14 and towards the ground via the diode 228 and the terminal 16.

Meanwhile, when any of the light source arrays 300 is open-circuited, the current of the cathode of the corresponding diode 220 decreases, the current flows through the diode 220, and the voltage across both ends of the base-emitter resistor 226 becomes small. Accordingly, the NPN transistor 224 is turned off, and the current flowing from the terminal 14 to the diode 228 is blocked.

Accordingly, since the NPN transistor 224 is turned on or off based on the received sum voltage which is the sum of the least current detection voltage among the current detection voltages caused by a plurality of the resistors for current detection 110 and the forward voltage of the diode 112, the vehicular lamp 10 in this embodiment can also properly detect the open circuit of the light sources 302, and send the detection result to the lighting controlling unit 500 properly.

In addition, in this embodiment, since the diode 112 and the NPN transistor 224 can be provided in common to a plurality of the light source arrays 300, the vehicular lamp 10 can reduce the number of its elements, and reduce the cost required to manufacture.

As obvious from the description above, according to the present invention, the vehicular lamp 10 can properly detect the open circuit of its light sources 302.

The vehicular lamp to which the present invention may be applied includes but not limited to headlamp, tail lamp and turn-signal lamp of automobiles, motorcycles and trains, and the headlamp includes, but not limited to, regular headlamp, fog lamp and cornering lamp.

Although the present invention has been described by way of exemplary embodiments, it should be understood that those skilled in the art might make many changes and substitutions without departing from the spirit and the scope of the present invention which is defined only by the appended claims.

What is claimed is:

1. A vehicular lamp for a vehicle, comprising:
   a semiconductor light emitting element for emitting light;
   a resistor for current detection for causing a current detection voltage in response to a current flowing through said semiconductor light emitting element, said resistor being coupled in series to said semiconductor light emitting element;
   a serial diode being coupled in series to said resistor for current detection and said semiconductor light emitting element in a forward direction; and
   an open circuit detecting unit for detecting an open circuit of said semiconductor light emitting element based on a sum voltage, which is a sum of a forward voltage of said serial diode and said current detection voltage.

2. A vehicular lamp as claimed in claim 1 further comprising:
   a plurality of said semiconductor light emitting elements being coupled in parallel; and
   a plurality of said resistors for current detection being provided respectively in response to each of said semiconductor light emitting elements for causing said current detection voltage in response to a current flowing through said corresponding semiconductor light emitting element, said resistors for current detection being coupled in series respectively to said corresponding semiconductor light emitting element,
   wherein said serial diodes is coupled in series to each of said semiconductor light emitting elements with said resistors for current detection interposed therebetween, and
   said open circuit detecting unit is provided in common to said semiconductor light emitting elements, and detects said open circuit of said semiconductor light emitting element based on said sum voltage, which is a sum of the smallest one of said current detection voltages caused by said resistors for current detection and said forward voltage of said serial diode.

3. The vehicular lamp as claimed in claim 1, wherein said open circuit detecting unit comprises:
   a transistor for detecting said open circuit by receiving a voltage based on said sum voltage as a base-emitter voltage thereof and being turned on or off in response to said base-emitter voltage; and
   a low threshold voltage diode having a forward threshold voltage lower than that of said serial diode, said low threshold voltage diode being coupled to an emitter terminal of said transistor in a forward direction.

4. The vehicular lamp as claimed in claim 3, wherein said open circuit detecting unit further comprises a coupling resistor being coupled in series to said semiconductor light emitting element and said low threshold voltage diode therebetween, and in parallel to said resistor for current detection, an electric resistance of said coupling resistor being larger than that of said resistor for current detection.

5. The vehicular lamp as claimed in claim 3 further comprising:
   a plurality of said semiconductor light emitting elements being coupled in parallel;
   a plurality of said resistors for current detection being provided respectively in response to each of said semiconductor light emitting elements for causing said current detection being coupled in series respectively to said corresponding semiconductor light emitting element; and
   a plurality of said serial diodes being provided respectively in response to each of said semiconductor light emitting elements, said serial being coupled in series respectively to said corresponding semiconductor light emitting element and resistor for current detection in a forward direction,
   wherein said open circuit detecting unit further comprises a plurality of said transistors respectively receiving a voltage based on a sum voltage caused by said corresponding resistor for current detection and serial diode as a base-emitter voltage thereof, said transistors being provided respectively in response to each semiconductor light emitting element, and
   said low threshold voltage diode is coupled in common to each emitter terminal of said transistors in said forward direction.

* * * * *